United States Patent [19]

Kramer et al.

[11] Patent Number: 4,459,595
[45] Date of Patent: Jul. 10, 1984

[54] CONDITION RESPONSIVE RF TRANSMITTING DEVICE

[75] Inventors: Dennis A. Kramer; Thomas J. Waraksa, both of Troy, Mich.

[73] Assignee: Rockwell International Corporation, Pittsburgh, Pa.

[21] Appl. No.: 332,074

[22] Filed: Dec. 18, 1981

[51] Int. Cl.$^3$ .......................... H01Q 1/24; G08B 1/08
[52] U.S. Cl. ...................... 343/701; 331/71; 331/116 FE; 340/539; 455/129
[58] Field of Search ........... 343/701; 331/71, 116 FE; 340/539, 58; 310/68 B; 455/129

[56] References Cited

U.S. PATENT DOCUMENTS 3,230,455  1/1966  Kosta ................................ 331/71

Primary Examiner—Eli Lieberman

[57] ABSTRACT

A device mounted on a power transmission device of a vehicle is utilized for transmitting an RF signal when a predetermined parameter exists in the power transmission device wherein the RF signal is capable of being received at a remote location. An electromagnetic transducer provides alternating voltage as power which is applied to an oscillator including a crystal filter, a junction field effect transistor and a resistor. The alternating voltage is applied across a drain and a source of the junction field effect transistor. The crystal filter is connected between the drain and the gate of the junction field effect transistor while the resistor is connected between the gate and the source of the junction field effect transistor. A wire antenna has a first end which is connected to the drain of the junction field effect transistor and a second end which is connected to the source of the junction field effect transistor to prevent transmission of any RF signal until the predetermined parameter is exceeded. Sensing elements mounted on the power transmission device indicate when any one of several parameters is exceeded and cause the second end of the wire antenna to be disconnected from the source of the junction field effect transistor to allow transmission of the RF signal.

9 Claims, 7 Drawing Figures

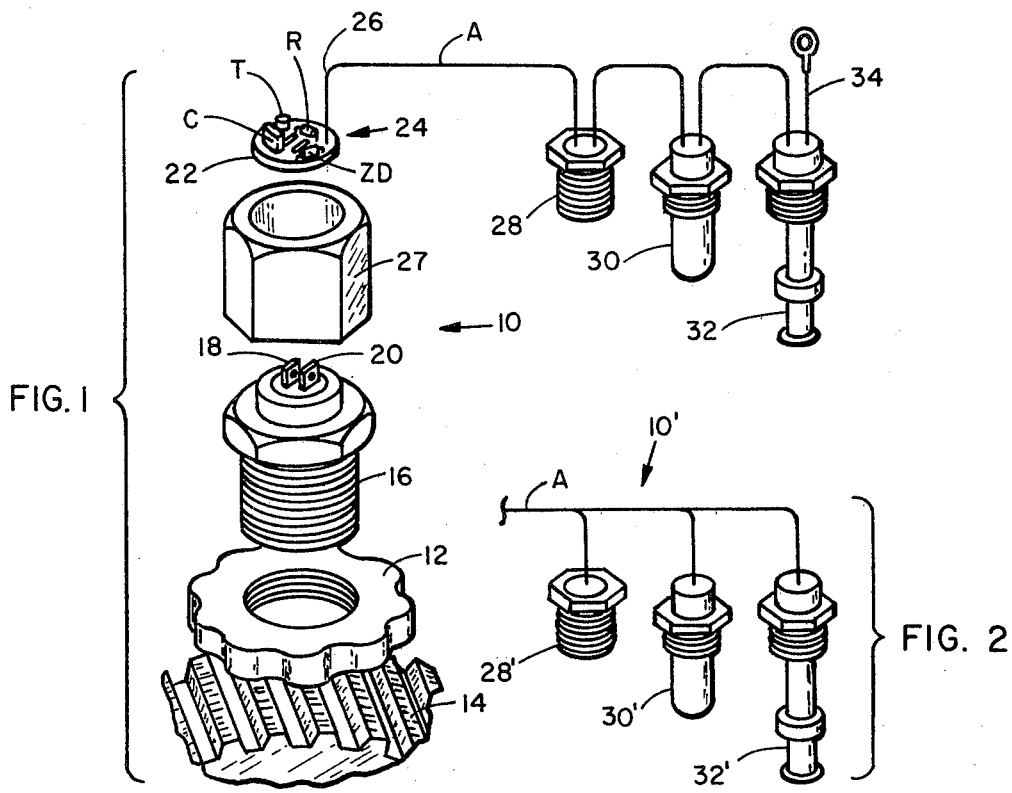
FIG. 1
FIG. 2
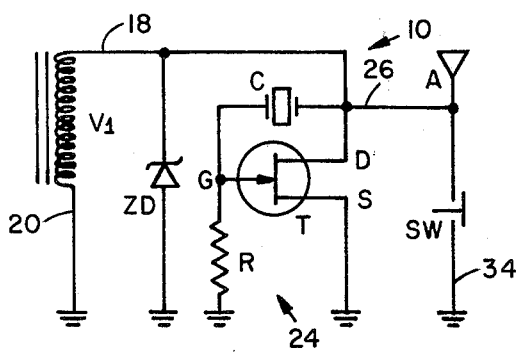
FIG. 3
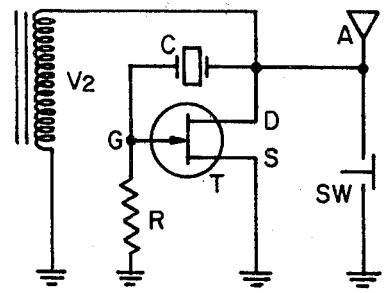
FIG. 6
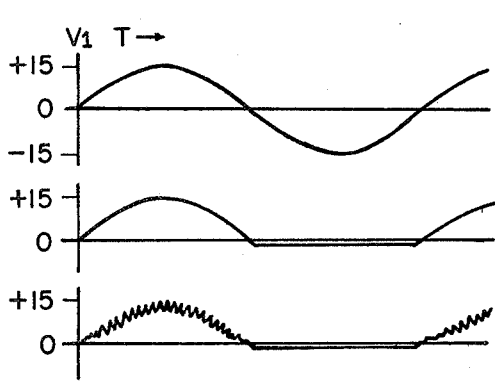
FIG. 4
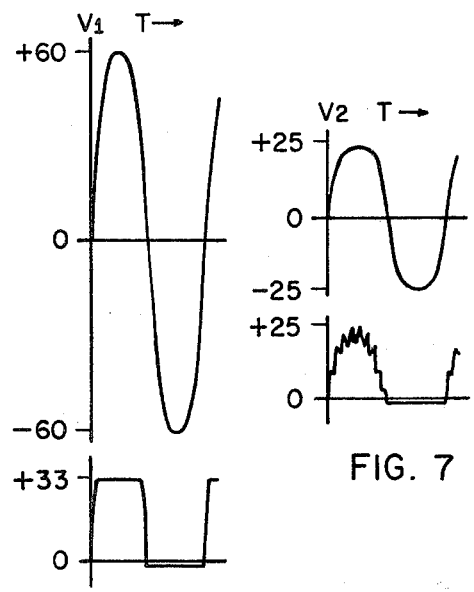
FIG. 5
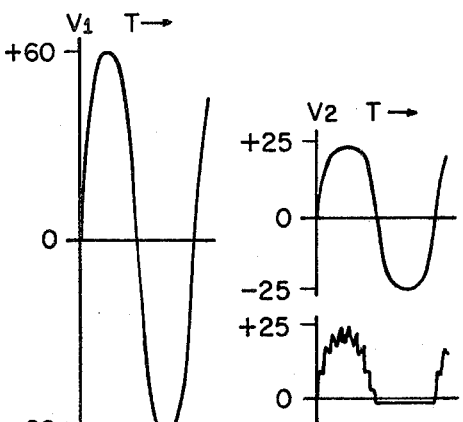
FIG. 7

CONDITION RESPONSIVE RF TRANSMITTING DEVICE

BACKGROUND OF THE INVENTION

1. Field of the Invention

This invention relates to a device for transmitting an RF signal which is capable of being received at a remote location and, more specifically, to such a device which is self-contained and installed on a vehicle power transmission device to indicate when a predetermined parameter associated with the operation of the power transmission device is exceeded.

2. Description of the Prior Art

As heavy duty trucks become more expensive and more complicated, there remains a need for providing systems which are capable of monitoring the various operating parameters of such trucks to insure that they will not be operated under conditions which are likely to damage or destroy any of their components. Although electronic signal and sensing devices are more commonly being utilized, they are usually employed in onboard electrical systems where the existence of some problems would only be indicated to the driver of the vehicle. For example, U.S. Pat. No. 4,229,728 is directed to a tire pressure monitoring system which includes at each wheel a self-contained tire monitor which is capable of transmitting a signal to the operator when the air pressure in one of the tires is at a low condition. While such a system as disclosed in U.S. Pat. No. 4,229,728 might be satisfactory for its limited purposes, the system is directed to only one operating parameter which is essential for proper truck operation and is sufficiently expensive and complicated to place its overall value in doubt.

Additionally, in organizations which operate an entire fleet of such heavy duty trucks, there is a continuing need for insuring that all such trucks are in a proper operating condition prior to their being dispatched from a central location. As a result, there is a continuing interest in providing a system which could also facilitate rapid, inexpensive and reliable monitoring of various parameters for each of the heavy duty trucks prior to its being released for operation on the highways.

SUMMARY OF THE INVENTION

It is, therefore, an object of this invention to provide a device for transmitting an RF signal to a remote location for monitoring the operating parameters of a vehicle.

Another object of the invention is to provide such a device which is self-contained and relatively inexpensive to provide and maintain.

It is still another object of this invention to provide such a device which will not contribute to RF pollution.

To provide these and other objects of the invention, a preferred embodiment thereof includes a device for transmitting an RF signal when a predetermined event is occurring wherein the RF signal is capable of being received at a remote locations. There is included means for providing an alternating voltage which is to be applied to an oscillator including a crystal filter, a junction field effect transistor and a resistor. The alternating voltage is applied across a drain and a source of the junction field effect transistor. The crystal filter is connected between the drain and a gate of the junction field effect transistor. The resistor is connected between the gate and the source of the junction field effect transistor. An antenna has a first lead line connected to the drain of the junction field effect transistor and a second lead line connected to the source of the junction field effect transistor which connection to the source will prevent transmission of the RF signal. The second lead line is disconnected from the source of the junction field effect transistor when the predetermined event is occurring to allow transmission of the RF signal. The means for providing the alternating voltage has an output impedence much larger than the output impedence of the oscillator at the natural frequency of the crystal filter of the oscillator.

BRIEF DESCRIPTION OF THE DRAWINGS

FIG. 1 is an exploded view of the preferred embodiment of the invention including various components thereof.

FIG. 2 is a view of alternative components for the embodiment as shown in FIG. 1.

FIG. 3 is a circuit diagram of the preferred embodiment of the invention.

FIG. 4 is a graphic diagram of various voltage curves associated with the circuit as shown in FIG. 3 under one operating condition.

FIG. 5 is a graphic diagram of various voltage curves associated with the embodiment shown in FIG. 3 under a different operating condition.

FIG. 6 is a circuit diagram of an alternative embodiment of the invention.

FIG. 7 is a graphic diagram of the voltage curves of the embodiment shown in FIG. 6 under a particular operating condition.

DESCRIPTIN OF THE PREFERRED EMBODIMENTS

As seen in FIG. 1, the preferred device 10 for transmitting an RF signal is utilized in an interaxle differential configuration and is capable of indicating when various operating parameters for the oil associated with the interaxle differential are exceeded. The preferred embodiment in the form of the device 10 was selected to satisfy a need for simply and effectively determining the operating condition of the lubricating oil system for an interaxle differential commonly found in heavy duty trucks of the type which are commonly operated in large numbers in the fleet operations of various types of companies.

In order to better understand the invention and the advantages in flexibility and reliability which it provides, it is advantageous to explain the business and marketing circumstances which make its various features particularly attractive for use in interaxle differentials for heavy duty trucks. It is not uncommon when providing heavy duty trucks for the original equipment manufacturer to buy an assembled interaxle differential for installation on such trucks prior to their complete assembly. The supplier of such an interaxle differential is obviously interested in the interaxle differential being properly maintained and operated to insure safe and reliable operation by the ultimate user of the truck. Accordngly, it is desirable to provide means, in additional to conventional, locally read devices, for conveniently insuring that the lubricating oil of such an interaxle differential is maintained at a sufficiently low temperature, that the oil pressure is maintained at a sufficiently high level and that the quantity of lubricating oil is sufficient to insure adequate lubrication for the interaxle differential. By monitoring these particular parameters, a company employing a large nubmer of such trucks could properly dispatch them with an assurance that the lubricating oil in the interaxle differential is in a proper condition to prevent damage to the interaxle differential. As a result, the supplier of the interaxle differential might avoid unnecessary problems which could decrease the acceptability of the interaxle differential and jeopardize future business opportunities.

For such a monitoring system to be attractive to the supplier of an interaxle differential, it must include a number of features which are not directly related to the monitoring function. For example, the system should be self-contained so that no additional wiring or installation need be done by the original truck manufacturer or the ultimate user. To insure acceptability of the system, the supplier would not wish to require the truck manufacturer to design and incorporate additional wiring or steps in the assembly process. Further, the monitoring system should be simple to maintain so that the company which ultimately uses the trucks would not expect an increase in maintenance expenditures but rather would expect a decrease in maintenance because of the prevention of problems associated with the interaxle differential. A company operating a large number of heavy duty trucks would be expected to purchase and monitor an RF receiver to actually monitor the interaxle differential parameters but this additional equipment expense would be on a one time basis and the monitoring might be accomplished by existing dispatch personnel at an operating facility.

Of primary concern to the supplier of the interaxle differential would be the overall expense for initially providing the monitoring system. Preferably, the monitoring system would be so inexpensive that it would not actually add to the overall cost of the interaxle differential so that there would not be any increase in cost to the original truck manufacturer or to the ultimate user of the truck. If the cost of the monitoring system can be maintained at a sufficiently low level, the interaxle differential supplier could include the monitoring system in each interaxle differential that is manufactured without having to make a specific determination that the ultimate user will be interested in and capable of utilizing the monitoring system. The monitoring system could then be utilized by interested companies having a large number of such heavy duty trucks and would be installed and available for any company which decided to initiate a monitoring system at some future date. As will be seen later, it would also be attractive if such a system could be adapted for use by trucks which are not expected to be owned by or operated by companies having a large number of such heavy duty trucks. The preferred device 10 and the various alternatives as described hereinbelow will be seen to be capable of satisfying the requirements for such a monitoring system.

Returning to a description of the preferred device 10, as seen in FIG. 1, the preferred device 10 is capable of transmitting an RF signal when a predetermined event occurs in the operation of an interaxle differential. The interaxle differential is only partially shown to include a housing 12 and a gear or toothed member 14 mounted therein. The gear 14 is preferably one normally found in an interaxle differential and mounted on a shaft such as the input shaft for the interaxle differential to insure that there will be adequate rotation of the gear 14 during operation of the interaxle differential. However, in some configurations a separate toothed member having no other function might be installed on a shaft without departing from the invention or altering the operation of the device 10. In order to be self-contained and to be independent of any other power source in the heavy duty truck which might require additional electrical wiring, the device 10 includes a means for providing an alternating voltage in the form of an electromagnetic transducer 16 having an electromagnetic sensing coil therein. The electromagnetic sensing coil, when the electromagnetic transducer 16 is properly installed, will be aligned with the rotating gear or tooth member 14 so that a plurality of ferromagnetic teeth thereon will produce an alternating voltage in the electromagnetic sensing coil.

Output terminals 18 and 20 of the electromagnetic sensing coil are electrically coupled to a printed circuit disc 22 which includes components thereon to provide an oscillator 24. Specifically, the components in the preferred oscillator 24 simply include a crystal filter C, a junction field effect transistor T and a resistor R. A zener diode ZD is also provided in the circuitry to protect the oscillator 24 as will be discussed hereinbelow.

An output of the oscillator 24 is provided by a lead line 26 which, in the preferred embodiment, is sufficiently long to act as a wire antenna A. During the assembly of the device 10, a housing 27 for the oscillator 24 would be rigidly installed on the electromagnetic transducer 16 and an epoxy material such as Emerson and Cumming 1365-90 would be utilized to completely encase and seal the oscillator 24 therein with only the lead line 26 extending therefrom. The antenna A is coupled in series to a temperature sensor 28, a pressure sensor 30 and a lubricating oil level sensor 32. The other lead line 34 of the antenna A will be grounded to the housing 12 during assembly as the temperature sensor 28, pressure sensor 30 and level sensor 32 are installed in sealed access ports at appropriate locations by design on the housing 12 for the monitoring of the various parameters within the housing 12 in a manner which is well known in the power transmission art. The sensors 28, 30 and 32 are each of the type which will independently produce an open circuit between the wire antenna A and the second lead line 34 if a satisfactory reading for its particular operating parameter is exceeded.

Although the specific circuitry and a detailed description of its operation will be provided hereinbelow, it can be seen from the preferred device 10 shown in FIG. 1 that the device for transmitting an RF signal of the present invention includes a minimum number of components and would be simple to assemble and install. It will be seen that the preferred components are common, readily available, off the shelf items so that the overall expense would be quite small when compared to the cost of other components within the interaxle differential. The preferred components will be seen to have proven reliability and the manner of assembling the device causes it to be sufficiently durable to expect extended maintenance free operation.

As should be clear from the explanation of the preferred device 10 as provided hereinabove, the device 10 would transmit an RF signal if any of the monitored parameters were to exceed a desired level. However, as seen in FIG. 2, an alternative device 10' might be selected to include an alternative temperature sensor 28', pressure sensor 30' and lubricating oil level sensor 32'.

The sensors 28', 30' and 32' would measure the identical parameters as the sensors for the device 10. However, the sensors 28', 30' and 32' would be in a parallel configuration with the antenna A as each sensor is provideed an internal coupling to its housing to be capable of conducting electricity to the housing 12 of the interaxle differential which would again serve as the ground. Consequently, in this parallel configuration, during normal operations there would be a continuous transmission of an RF signal and when any one of the measured parameters is exceeded, a contact within its sensor would be closed to cause the antenna A to be coupled to the housing 12 and ground. In other words, the preferred embodiment of the invention in the form of device 10 of FIG. 1 would operate to cause transmission of the RF signal when a predetermined event occurs in the form of exceeding one of the operating parameters. On the other hand, in the alternative device 10', the predetermined event which produces an RF signal would be the normal operation of the interaxle differential and exceeding one of the operating parameters would terminate the transmission of the RF signal as a contact in one of the sensors 28', 30' and 32' produces a grounding of the antenna A.

It should be noted that neither system would be entirely fail safe and that the device 10 would erroneously indicate an improper operating parameter if there were a break in the antenna A or either of the lead lines 28, 34. On the other hand, if there were a ground in any of these lines and one of the parameters were exceeded, a signal would not be transmitted. Similarly, in the device 10', a break in the antenna wire would allow continuous transmission of an RF signal even if one of the parameters were to be exceeded to cause the internal switch in the appropriate sensor to be closed and ostensibly connect the antenna A to ground. Also, if the antenna wire A were to be grounded at a location other than at a sensors 28', 30' and 32'; the termination of an RF signal might appear to indicate that there are problems when, in fact, none exists. This explanation is not meant to detract from the present invention since any electrical monitoring system would be subject to the same type of problems. However, it further demonstrates the flexibility of the devices and various operating conditions which can be considered when selecting one of the alternatives.

As seen in FIG. 3, a circuit diagram of the preferred device 10 includes the alternating voltage source V1 with terminals 18 and 20 being applied to the oscillator 24. Specifically, the terminal 18 is connected to the drain D of the junction field effect transistor T while the terminal 20 is connected to ground in the form of the housing 12. Although, as mentioned above, the terminal 20 is connected to the printed circuit disc 22, the circuit disc 22 is electrically coupled to the housing 27 in a manner which will conduct electricity through the body of the electromagnetic transducer 16 to the housing 12. As can be seen in FIG. 3, other components are also connected to ground in this manner so that the terminal 20 is at the same electrical potential as is the source S of the junction field effect transistor.

The crystal filter C of the oscillator 24 is connected between the drain D and the gate G of the junction field effect transistor T. The resistor R is connected between the gate G and the ground having the same electrical potential as the source S of the junction field effect transistor T.

The antenna A, which, as discussed hereinabove, is in the form of a simple insulated wire in the preferred device 10, has its first lead line 26 connected to the drain D of the junction field effect transistor T. Obviously, other types of antennas well known in the art might be utilized but would probably be more expensive, more difficult to install and maintain and have a greater liklihood of damage and failure. The other lead line 34 of the antenna A is coupled to the source S of the junction field effect transistor T through the switch SW, representing any one of the sensors 28, 30, 32, 28', 30' and 32'. When the switch SW is in an open position transmission of an RF signal is allowed since the antenna A is disconnected from the source S of the junction field effect transistor T.

A zener diode ZD is in parallel with the oscillator 24 to prevent the alternating voltage V1 from reaching a magnitude which would cause damage to the oscillator 24. A further explanation of the consequences of using such a zener diode ZD will be provided hereinbelow.

In order to demonstrate how the device 10 would be expected to operate, a detailed discussion of specific components and their functions is appropriate. The preferred electromagnetic transducer 16 is of the variable reluctance type and is installed within the housing 12 to have a minimal gap between the end thereof and the teeth on the gear 14. Preferably, the gear 14 in one interaxle differential configuration would include 24 teeth and rotate between 150 and 1200 RPMs for a normal operating range for the vehicle of 5 to 40 miles per hours. The 5 to 40 miles per hour range has been selected as a range which would be attractive to companies operating a large number of heavy duty trucks since it is a speed which could be properly controlled for monitoring during dispatching of the trucks.

As seen in the upper portion of FIG. 4, if the vehicle were to be operated at about 20 miles per hour, the voltage created by the electromagnetic transducer 16 would range from a plus 15 volts to a minus 15 volts with a frequency of about 240 cycles per second if not influenced by the other components in the device 10.

While it is not uncommon to use an alternating power source for a transmitting device, the alternating power source is normally rectified to produce a direct current voltage for application to the transmitter in a manner similar to that found in the system disclosed in U.S. Pat. No. 4,229,728. However, as can be seen from the circuitry shown in FIG. 3, no such rectification is provided even though the zener diode ZD does prevent any significant negative voltage as shown in the middle diagram of FIG. 4. Accordingly, with a preferred zener diode ZD of the 1N973A type, the negative voltage phases would be limited to approximately minus 1 volt. Since the break down voltage for zener diode 1N973A is approximately 33 volts, it would not affect the positive voltage phases for the condition shown in FIG. 4. The operation at approximately 20 miles per hour results in a peak voltage well below the 33 volts which has been selected to protect the oscillator 24 even though somewhat higher voltages might still be within its capacity and not be detrimental to its operation.

The oscillator 24 includes crystal filter C which is of the series resonant type and is capable of establishing a carrier frequency of 517 KHz. The carrier frequency 517KHz was selected because it is at the lower range of the AM Broadcast band and allocated by the FCC for purposes such as this. The junction field effect transistor T is a 2N4338 type which tends to operate only on the positive voltage cycles. The resistor R is rated at 10 Meg.-ohms. With the oscillator 24 so designed, the resulting signal voltage which is produced at the antenna A is as shown in the lower portion of FIG. 4. Approximately 1.5 volts is needed to initially fire the junction field effect transistor and oscillation continues with a voltage variation of approximately 3 volts throughout the positive voltage phases as created by voltage V1. To allow the signal to be transmitted by the antenna A, it is essential that the electromagnetic transducer 16 have an output impedance which is much larger than the output impedence of the oscillator 24 at the natural frequency of the crystal filter C. This allows oscillation to continue unaffected by the electromagnetic transucer 16 and eliminates the need for an RC filter which was needed in the device shown in U.S. Pat. No. 4,229,728, mentioned hereinabove, to prevent the RF signal from traveling back to the electromagnetic tranducer 16.

It should be noted that the preferred device 10 includes a form of transmission which departs from many prior art transmitters in the fact that there is no specific modulator circutiry to modulate the carrier signal as was required in U.S. Pat. No. 4,229,728. The present invention takes advantage of the fact that the supply voltage is alternating and retention of only the positive phases will result in pulses which are discernable and capable of being received by a remote receiver. Another feature which differs significantly from most prior art transmitter systems includes the location of the sensors represented in FIG. 3 by the switch SW. Normally, transmission is prevented by a switch which is located between the power source and the transmitter, again, in a manner as included in U.S. Pat. No. 4,229,728. However, since the device 10 eliminates unnecessary wiring while accomplishing the same overall objective, it is preferred.

As mentioned above, the circuitry shown in FIG. 3 will function to produce the RF signal shown at the lower portion of FIG. 4 when the vehicle is operating at approximately 20 miles per hour. Transmission would not be expected at speeds much below 5 miles because the magnitude of the voltage V1 at such lower speeds would not be sufficient to fire the junction field effect transistor T. As the speed of the vehicle increases to approximately 40 miles per hour, the peak voltage created by the electromagnetic transducer 16 would approach 33 volts and the zener diode ZD would begin to break down to prevent excessive voltage from being applied to the oscilator 24. In order to prevent destruction of the zener diode ZD, the preferred electromagnetic transducer 16 has a self-limiting current source capacity.

As thus described, it might appear that an RF signal would be generated by the preferred device 10 at any time that one of the predetermined events is occuring. However, it has been found that for speeds which are sufficiently high to generate the break down voltage for the zener diode ZD, no transmission of an RF signal is possible. For example, as shown in FIG. 5, when the vehicle is operating at approximately 80 miles per hour, the electromagnetic transducer 16 would produce a higher voltage V1 having a peak of approximately 60 volts with a frequency of about 960 cycles per second. In this situation, as shown at the bottom of FIG. 5, the zener diode ZD would limit the positive cycles to 33 volts and again cause the negative cycles to be limited to approximately minus 1 volt. Apparently, when the zener diode breaks down, there is sufficient current being passed therethrough to ground to prevent the proper operation of the oscillator 24. Accordingly, no oscillated signal is produced and no RF signal will be transmitted by the antenna A. As a result, when the vehicle is operating above 40 miles per hour no unnecessary RF signals will be transmitted which might otherwise cause RF pollution. As a result, the preferred device 10 would be expected to satisfy governmental requirements and regulations regarding the transmission of RF signals.

However, in fact, very little, if any, RF pollution would be expected with the preferred device 10 even when it is operating at a lower speed which could result in the transmission of an RF signal. Because of the low voltages produced by the electromagnetic transducer 16, the expected range for the RF signal would be limited to about 10 feet. A company utilizing a large number of heavy duty trucks having the preferred device 10 installed thereon would preferably use a ground located antenna and could employ any type of conventional receiver set at the frequency of 517 KHz. In fact, the receiver might be operated by a crystal to be limited to the frequency of 517 KHz only. The trucks would be driven over the antenna at a speed within the operating range of 5 to 40 miles per hour as a dispatcher monitored the receiver to determine if the operating parameters are satisfactory. Only those trucks with some indication of a problem would have to be stopped and checked for corrective action.

Additionally, if it is desired, a receiver could also be installed on the vehicle itself for use by the operator. The receiver could be installed in the cab of the vehicle and could utilize existing wiring, such as brake light wiring for a receive antenna or any conventional automotive receiver antenna. The operator would then be able to monitor the various components of the interaxle differential at all times when the vvehicle is being operated between the 5 to 40 mile per hour range.

It should be noted, that while the 5 to 40 mile per hour range has been selected in the preferred embodiment, the invention can be easily adapted to other speed ranges. While the preferred zener diode ZD has been selected to protect the particular oscillator 24, it should be clear that oscillators having different transmitting frequencies and needing different voltage protection might allow a different zener diode to be utilized so that operation at a higher speed would be possible. The example provided hereinabove should enable one skilled in the art to select the components to alter various operating parameters of the invention while still falling within the scope of the invention as claimed.

However, rather than actually changing the various components within the circuitry shown in FIG. 3, it should be kept in mind that some alterations can be made to the operating parameters by simply changing the gap between the electromagnetic transducer 16 and the gear 14. For example, if a particular company wanted to operate a fleet of heavy duty trucks and considered dispatching speeds at approximately 20 miles per hour to be more appropriate, a sheet of "MYLAR", a registered trademark of E. I. DuPont DeNemours & Co., Inc., could be affixed to the end of the electromagnetic transducer 16 when it is installed to increase the gap between the electromagnetic transducer 16 and the gear 14. With the gap increased a predetermined amount, the resulting voltage at 40 miles per hour would have a magnitude approximately equal that shown in FIG. 4 even though the frequency would be doubled. As a result, the operating range would then be expected to be from approximately 10 miles per hour to 80 miles per hour. The resulting larger range would allow a receiver mounted onboard the truck to be capable of indicating a problem without having to reduce the speed of the vehicle to the degree as required in the preferred embodiment.

In fact, if the gap between the electromagnetic transducer 16 and the gear 14 were significantly larger, the voltage produced might not be capable of even exceeding the 33 volts limit requiring the zener diode ZD. Therefore, as seen in FIG. 6, it might be possible to utilize an alternative device including similar components while completely eliminating the zener diode ZD. As a result, the voltage V2 produced with the larger gap would, for example, as shown in FIG. 7, produce a maximum peak voltage of about 25 volts with a frequency of 960 cycles per second as was the case shown in FIG. 5 when the vehicle is operating at 80 miles per hour. However, even with no zener diode to alter the voltage curve, the oscillator 24 would produce a signal voltage curve as shown in the lower portion of FIG. 7. As mentioned hereinabove, the transistor T would tend to operate only on the positive voltage cycles of the output voltage V2 so that discernable pulses would again be transmitted when the predetermined event is occuring. Obviously, this particular adaptation of the preferred device would be expected to be limited to use with onboard receivers since a corresponding change in the lower speed limit would inherently result. Therefore, transmission would be expected between a speed of approximately 20 and 100 miles per hour which would probably be too high a speed to expect satisfactory monitoring at a dispatch location over a fixed antenna.

It should now be clear that any number of alterations can be made to the invention to adapt the transmitting device to satisfy any number of operating conditions. Each device would still be expected to be self-contained and operate relatively maintenance free. Additionally, the device would be expected to be relatively inexpensive when compared to most other types of transmitters since the preferred configuration eliminates voltage doubling and rectification circuitry, modulation circuitry, filtering to prevent RF signals from traveling back to the voltage source and conventional switching means located between the voltage source and the transmitter.

Although the entire explanation provided hereinabove for the preferred device has implied that it should be and would be utilized in an interaxle differential, it should now be clear that an almost identical type of device could be utilized with an engine or a transmission to monitor parameters associated with their proper operation. Clearly, any device which would be self-contained, relatively inexpensive and durable for monitoring these elements of a heavy duty truck would be just as attractive as would be such a device for an interaxle differential. Obviously, the parameters to be monitored would be different and, in fact, additional parameters could also be adapted into the system for monitoring other factors associated with the interaxle differential. For example, additional sensors might be added to determine brake lining wear or tire pressure without departing from the invention as claimed.

We claim:

1. A device for transmitting an RF signal when a predetermined event is occuring, said RF signal being capable of being received at a remote location, said device comprising:

means for providing an alternating voltage;
    said alternating voltage being applied to an oscillator including a crystal filter, a junction field effect transistor and a resistor;
    said alternating voltage being applied across a drain and a source of said junction field effect transistor;
    said crystal filter being connected between said drain and a gate of said junction field effect transistor;
    said resistor being connected between said gate and said source of said junction field effect transistor;
    an antenna having a first lead line connected to said drain of said junction field effect transistor;
    said antenna having a second lead line connected to said source of said junction field effect transistor to prevent transmission of said RF signal unless said predetermined event is occuring, said second lead line being disconnected from said source of said junction field effect transistor when said predetermined event is occuring to allow transmission of said RF signal; and
    said means for providing said alternating voltage having an output impedance much larger than the output impedance of said oscillator at the natural frequency of said crystal filter of said oscillator.

2. The device for transmitting an RF signal as set forth in claim 1, wherein said junction field effect transistor is positively biased to cause said oscillator to produce said RF signal only when a positive voltage is being applied to said drain of said junction field effect transistor.

3. The device for transmitting an RF signal as set forth in claim 1, wherein said means for providing an alternating voltage is an electromagnetic transducer.

4. The device for transmitting an RF signal as set forth in claim 3, wherein said electromagnetic transducer includes an electromagnetic sensing coil aligned with a rotating element having a plurality of ferromagnetic teeth means disposed thereon.

5. The device for transmitting an RF signal as set forth in claim 4, further including a support housing for said electromagnetic sensing coil and said oscillator.

6. The device for transmitting an RF signal as set forth in claim 5, wherein said oscillator is encased and sealed within said support housing in an epoxy material.

7. The device for transmitting an RF signal as set forth in claim 5, wherein said antenna is a wire extending from said support housing and said oscillator therein and said second lead line includes a portion of said support housing which is capable of conducting electricity.

8. The device for transmitting an RF signal as set forth in claim 7, wherein said second lead line is connected and disconnected from said source by a monitoring switch in said wire at an opposite end thereof from said oscillator, said monitoring switch being capable of being responsive to monitoring for said predetermined event to be closed when said predetermined event is occurring and opened when said predetermined event is not occurring.

9. The device for transmitting an RF signal as set forth in claim 1, further including a zener diode in parallel with said junction field effect transistor, a cathode terminal of said zener diode being connected to said drain of said junction field effect transistor, a anode terminal of said zener diode being connected to said source of said junction field effect transistor, said zener diode providing voltage protection for said oscillator, said means for providing said alternating voltage having a self-limiting current source capacity to prevent destruction of said zener diode.

* * * * *